United States Patent
De La Bardonnie et al.

(10) Patent No.: US 9,651,951 B2
(45) Date of Patent: May 16, 2017

(54) CONTROL DEVICE FOR OPENING AND CLOSING AN AIRCRAFT DOOR

(71) Applicant: RATIER FIGEAC, Figeac (FR)

(72) Inventors: Jean De La Bardonnie, Vindelle (FR); Bertrand Prouzet, Figeac (FR)

(73) Assignee: RATIER FIGEAC, Figeac (FR)

( * ) Notice: Subject to any disclaimer, the term of this patent is extended or adjusted under 35 U.S.C. 154(b) by 63 days.

(21) Appl. No.: 14/578,808

(22) Filed: Dec. 22, 2014

(65) Prior Publication Data

US 2015/0198955 A1   Jul. 16, 2015

(30) Foreign Application Priority Data

Dec. 24, 2013 (FR) .................................. 13 63572

(51) Int. Cl.
| | | |
|---|---|---|
| *G05D 3/00* | (2006.01) | |
| *B64C 1/14* | (2006.01) | |
| *E05F 15/603* | (2015.01) | |
| *E05F 15/611* | (2015.01) | |
| *E05F 15/70* | (2015.01) | |

(52) U.S. Cl.
CPC ............. *G05D 3/00* (2013.01); *B64C 1/1407* (2013.01); *E05F 15/603* (2015.01); *E05F 15/611* (2015.01); *E05F 15/70* (2015.01)

(58) Field of Classification Search
CPC .................................. G01C 9/00; G06F 11/00
See application file for complete search history.

(56) References Cited

U.S. PATENT DOCUMENTS

| | | | |
|---|---|---|---|
| 2,931,599 A | 4/1960 | McQuilkin | |
| 5,251,851 A * | 10/1993 | Herrmann | B64C 1/143 244/129.5 |
| 5,480,109 A * | 1/1996 | Klein | B64C 1/1407 244/129.5 |
| 5,803,404 A | 9/1998 | Petrou et al. | |
| 5,881,973 A * | 3/1999 | Agajanian | E05B 47/00 244/129.5 |
| 5,984,234 A * | 11/1999 | Brouwer | E05B 77/54 244/129.5 |
| 6,454,210 B1 * | 9/2002 | Plattner | B64C 1/1415 244/129.5 |
| 6,467,729 B2 * | 10/2002 | Buchs | B64C 1/1407 244/129.5 |

(Continued)

FOREIGN PATENT DOCUMENTS

| | | |
|---|---|---|
| DE | 10 2011 00400 | 9/2012 |
| EP | 1 177 975 | 2/2002 |

OTHER PUBLICATIONS

French Preliminary Search Report, FR 1363572, Aug. 12, 2014.

*Primary Examiner* — Thomas Tarcza
*Assistant Examiner* — Alex C Dunn
(74) *Attorney, Agent, or Firm* — Volpe and Koenig, P.C.

(57) ABSTRACT

A device for opening and closing according to the invention relates to an aircraft door (2) hinged around an axis (6) substantially parallel to the longitudinal axis the aircraft comprising a motorized mechanism and a driving system combined with a control device comprising a system for acquisition of the angular position of the door (2) relative to the structure (4) the aircraft, where said angular position acquisition system for the door comprises at least one inclinometer (20) combined with the door (2).

17 Claims, 4 Drawing Sheets

(56) References Cited

U.S. PATENT DOCUMENTS

| | | | |
|---|---|---|---|
| 6,547,185 B2* | 4/2003 | Erben | B64C 1/1407 244/129.4 |
| 6,659,401 B1* | 12/2003 | Semprini | B64C 1/1469 244/118.5 |
| 6,742,744 B2* | 6/2004 | Schreitmueller | B64C 1/1407 244/129.5 |
| 6,786,454 B2* | 9/2004 | Baderspach | B64C 1/1407 244/129.5 |
| 8,126,676 B2* | 2/2012 | Smith | G01B 21/22 702/151 |
| 8,201,777 B2* | 6/2012 | Wilson | B64C 1/1415 244/129.5 |
| 8,849,475 B1* | 9/2014 | Sudolsky | G05D 1/0055 701/2 |
| 2002/0162916 A1* | 11/2002 | Baderspach | B64D 25/14 244/137.2 |
| 2003/0089826 A1* | 5/2003 | Barba | B64C 1/1407 244/129.1 |
| 2005/0044738 A1* | 3/2005 | Adams | G01C 9/00 33/371 |
| 2008/0098538 A1* | 5/2008 | Hutton | B64F 1/3055 14/71.5 |

\* cited by examiner

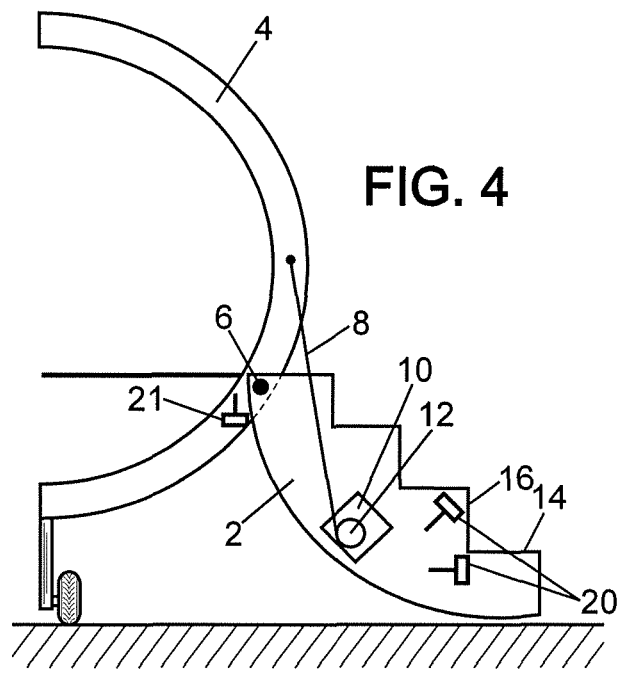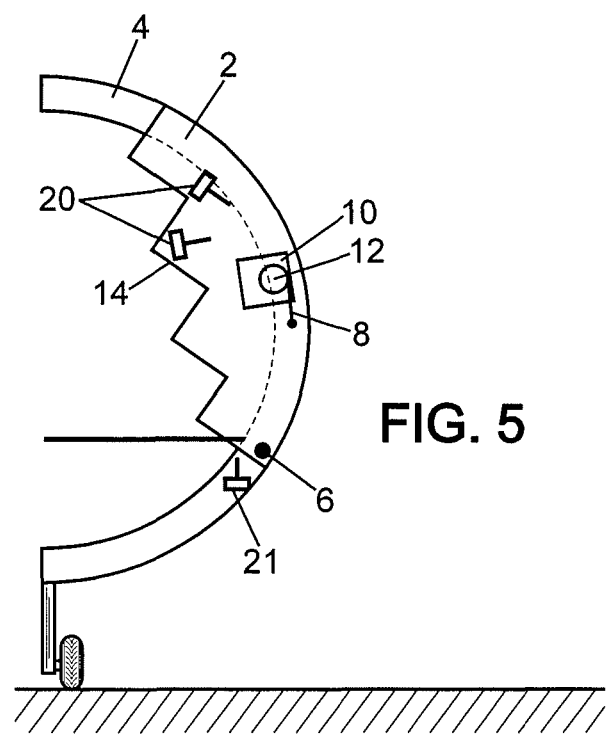

CONTROL DEVICE FOR OPENING AND CLOSING AN AIRCRAFT DOOR

BRIEF SUMMARY OF THE INVENTION

The present invention relates to a device for control of opening and closing an aircraft door.

The present invention relates more specifically to an aircraft door which opens and closes by pivoting around a substantially horizontal axis (at the time of opening the door, when the aircraft is landed on the ground). It thus relates more specifically to aircraft called business airplanes or else also to aircraft used commercially for passenger transport intended for transporting a limited number of passengers (some tens at most in general).

In fact, on this type of aircraft, opening and closing of doors is done by rotation of the door along an axis nearly parallel to the lubber line of the aircraft, meaning the longitudinal axis thereof.

On aircraft of this modern design type, an electric opening and closing device is provided, whereas on older aircraft the opening and closing of the door is done manually.

This modernization moves towards greater ergonomics but also has a goal of attempting to limit the overall mass of the aircraft. In fact, with a manual control system it is necessary to provide both systems for helping with force (e.g. torsion bars, springs, etc.) to make actuation by a single person possible and also means for damping at the end of range (hydraulic and or mechanical dampers).

Driving an electric motor for a motorized control system for door opening and closing does not pose a problem during the median part of the range of travel of the door. During this phase of movement of the door, the driving algorithm does not need to have a great finesse. In contrast, during the phase of starting the opening or closing cycle and also during the end of the opening cycle and the closing cycle, a precise management is necessary in order to limit the forces in the door and in the structure of the aircraft on closing or on contact with the ground.

Good management of the beginnings and ends of cycles both for opening and closing relies on good knowledge of the relative position of the door compared to the aircraft.

It is then known from the state of the prior art to combine with the driving system of the control device a door inclination acquisition system which can be based in a first example on a direct measurement of the inclination of the door by measuring the angle between the aircraft structure and the door, and in a second example by doing in indirect measurement of the inclination of the door through mechanical tricks. In a first example, a sensor is referenced to the aircraft structure, by, for example, being integrated in the area of a hinge on which the door turns. In a second example, a micro reducing-gear can be provided which determines the inclination of the door from the number of turns made by a pulley receiving a control system drive cable.

In both examples given, the mechanical integration done is costly, bulky and additionally makes the mechanism substantially heavier. Furthermore, the sensor used—for each of these two examples—is itself relatively expensive, bulky and heavy. It is additionally useful to provide a zero adjustment during installation of the sensor on board the airplane. Finally, known systems of this type do not guarantee in all cases knowing the position of the door even after an interruption of the opening and or closing cycle.

The purpose of the present invention is then to provide a door opening and closing device for aircraft with which to resolve these technical problems. The purpose thereof is especially to provide a device with an easy to incorporate sensor. Preferably, such a sensor will be relatively light and low-cost. Finally, beyond the reliability thereof, this sensor will be characterized preferably by the fact that it can give information on the angular position of the door in all circumstances, even after an interruption of an opening cycle or closing cycle.

For this purpose, the present invention proposes a device for opening and closing an aircraft door hinged around an axis substantially parallel to the longitudinal axis of the aircraft comprising a motorized mechanism and a driving system combined with a control device comprising a system for acquisition of the angular position of the door relative to the structure of the aircraft.

According to the present invention, the system for acquisition of the angular position of the door comprises an inclinometer combined with the door.

With this original solution, the position of the door can be known without having to measure a relative position between the door and the aircraft structure. Because of this, the sensor, here the inclinometer, is mounted on the door without connection with the structure of the aircraft. The assembly is therefore simplified. Furthermore, it is less bulky and reduced mass.

In the device according to the present invention, the inclinometer is for example chosen from the set including unbalanced-mass inclinometers, inclinometers in the form of a micro-electromechanical system (MEMS) and inertial units.

In an embodiment of the invention, when the aircraft door in closed position comprises on the inside surface thereof stairs having treads and risers, then the inclinometer is for example mounted parallel to a riser of the stairs.

For processing the signal provided by the inclinometer, it can be provided that at least one inclinometer supplies the driving system a signal representative of the inclination of the door and that the driving system adjusts a speed and/or force servo control law or else a damping law for the motorized mechanism on the basis of the inclination value of the door. A variant then advantageously provides that the driving system compares the information coming from at least one inclinometer to predetermined thresholds each corresponding to a threshold of change of the servo control and/or damping law. An adjustment of the opening speed of the door by the motorized mechanism by adjustment of a load applied on the motorized mechanism can then be done by the driving system.

Implementation variants of a device according to the invention such as described above can provide that:

The acquisition system comprises two inclinometers mounted in quadrature.

The acquisition system comprises a biaxial inclinometer

It additionally comprises an inclinometer attached to the aircraft structure, referred to as reference inclinometer.

It comprises a control box for the motorized mechanism comprising electronic boards, and at least one inclinometer is integrated on an electronic board for the control box (the control box can either be mounted on the aircraft door, in which case it will preferably receive at least one inclinometer providing an angular value concerning the position of the door or be mounted on the aircraft body in which case it will preferably receive at least one inclinometer providing a reference angular value for an inclinometer mounted on the door).

By providing an inclinometer attached to the structure, an initial reference can be acquired and stored and then a zeroing operation for the inclinometer (or inclinometers) mounted on the door can be avoided.

BRIEF DESCRIPTION OF THE DRAWINGS

Details and advantages of the present invention will become clearer from the following description made in reference to the attached schematic drawing in which:

FIGS. 4 and 5 are views similar to those from FIGS. 1 to 3 for a variant implementation of the opening/closing device.

DETAILED DESCRIPTION OF THE INVENTION

Figure 1:
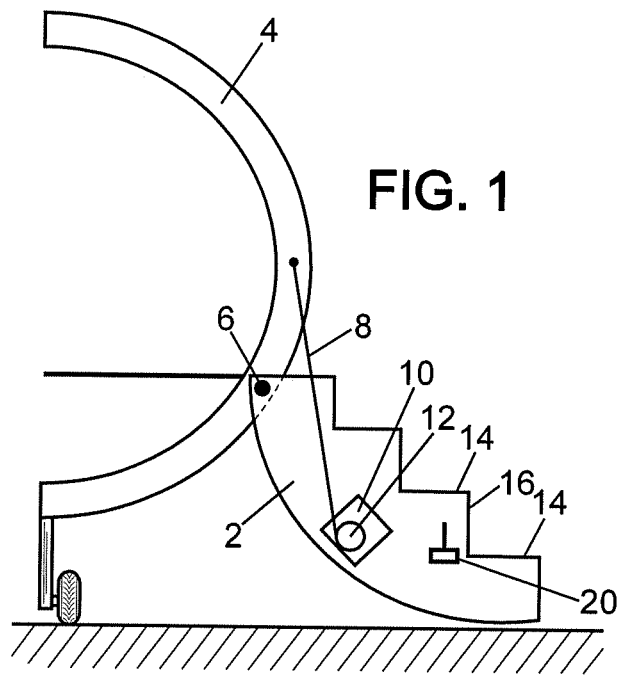
FIG. 1 is a schematic view corresponding to a transverse section of an aircraft with the door pivoting around a horizontal axis and provided with an opening/closing device according to the invention.

In the following description, the invention will be illustrated with reference to a door 2 of a business aircraft intended to allow access to the aircraft cabin. Of course, it can apply to other similar doors (e.g. access to a hold, access to a commercial aircraft cabin, etc.) in the aeronautic field.

The door 2 is hinged relative to an aircraft body 4 of the business aircraft around an axis of rotation 6. Here it is assumed that it involves a door 2 with an axis of rotation 6 nearly parallel to the lubber line of the aircraft, meaning substantially parallel to the longitudinal axis thereof. Thus, when the aircraft is on the ground, for example in an airport, the axis of rotation is substantially horizontal.

The door 2 is provided with a motorized mechanism for opening and closing thereof. As suggested in FIGS. 1 to 5, here a mechanism comprising a cable 8 connecting the aircraft body 4 to the door 2 is provided. Gravity acts in the direction of opening the door 2; the angle of inclination of the door 2 relative to the axis of rotation 6 is changed by acting on the length of the cable 8 between the door 2 and the aircraft body 4. A motor incorporated in the electric box 10 is combined with a winding pulley 12 on which the cable 8 can be wound and unwound.

Other embodiments can also be considered. In the case of a cable system, it is possible for example to plan on having one or more guide pulleys, placing the electric box on the aircraft body 4 and even having a mechanical system without cables with, for example, motorized articulated arms.

The door 2 shown has on its inner surface (in closed position of the door) treads 14 and risers 16 of the stairs. The stairs are made such that the treads 14 are located substantially horizontally in open position of the door 2 (see FIGS. 1 and 4) thereby providing easy access to the inside of the cabin.

The motorized mechanism for opening and closing the door 2 comprises a driving system which is advantageously incorporated in the electric box 10. This driving system controls the motor of the motorized mechanism by giving especially instructions on rotation direction and speed. To perform this driving, conventionally, sensors provide measurement results to the driving system which incorporates them for adapting the angular position and rotation speed of the motor. Among these sensors, it is appropriate, preferably, to provide a sensor with which to indicate the position of the door 2.

Figure 2:
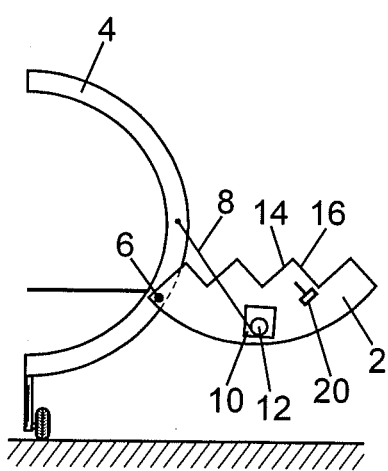
FIGS. 2 and 3 show the same door as the one from FIG. 1 in different positions.
Figure 3:
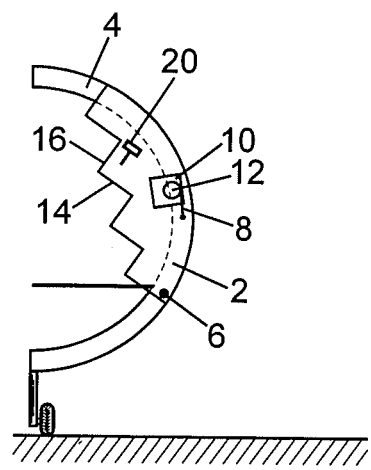

According to the present invention, the position of the door 2 is measured using at least one inclinometer. FIGS. 1 to 3 illustrates an embodiment making use of a single inclinometer whereas FIGS. 4 and 5 use a pair of inclinometers. The embodiments shown and described do not reflect a possible redundancy which would be required in the aeronautic domain and according to which it would be appropriate to provide at least two inclinometers in the embodiment of FIGS. 1 to 3 and at least two pairs of inclinometers in the embodiment from FIGS. 4 and 5. Similarly two motors and two driving systems could be necessary. Such redundancy will not be further considered in the remainder of the description.

Different types of inclinometers can be used here. Three families of inclinometers are proposed here as being preferred embodiments for the present invention. It can for example be an unbalanced-mass inclinometer. Such an inclinometer comprises a pendulum, meaning a mass combined with an arm pivoting around an axis, thus forming an unbalanced mass. Such a system is clearly sensitive to gravity. By knowing the position of the pendulum, the inclination of a reference surface can be deduced. The inclinometer can also have another embodiment in the form of a micro-electrical mechanical system known to the person skilled in the art under the name: "MEMS inclinometer". Finally, the third type of inclinometers proposed here as a preferred embodiment is the family of inertial units. This last type of inclinometers can be used to also indicate an acceleration in addition to the angular position of the sensor. In the present application, by using an inertial unit the rotation speed of the door 2 can then be known.

Using an inclinometer has the advantage that the sensor (inclinometer) is autonomous and can be incorporated in the door 2 without mechanical connection and without any reference with the fixed part, especially the aircraft body 4, of the aircraft. In fact, the measurement provided does not depend on the Earth's gravitational force and thereby makes it possible to provide an absolute measurement and not a relative position measurement between a fixed part and a mobile part of the aircraft. Consequently, the inclinometer can be placed in any area at the door 2, including inside the electric box 10.

For using the inclinometer, it is possible to start from the principal that opening and closing the door of an aircraft is almost always done on a tarmac and that in the vast majority of cases a tarmac is horizontal.

Another advantage of using an inclinometer, especially an inclinometer as proposed here, is that these devices are generally lightweight, low volume and low-cost Also they additionally have very good resistance to conventional mechanical environmental constraints of aircraft (e.g. vibrations, impacts, etc.).

Figure 6:
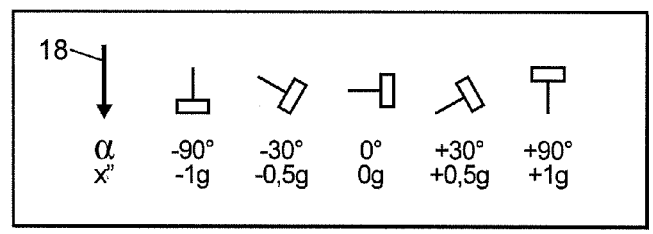
FIG. 6 shows a qualitative relation between acceleration due to the Earth's gravity and the orientation of an inclinometer.

FIG. 6 shows a qualitative relation between acceleration due to the Earth's gravity and the orientation of an inclinometer relative to the horizontal. An arrow 18 shows the direction of application of the gravitational force. A pendulum symbolizing an inclinometer, for example an unbalanced-mass inclinometer, is shown in five distinct positions. For each position, the figure shows the angular value α of the inclination of the inclinometer relative to a plane perpendicular to the arrow 18, meaning relative to the horizontal, and also the corresponding acceleration x" (g is equal to about 9.8 ms$^{-2}$).

Figure 7:
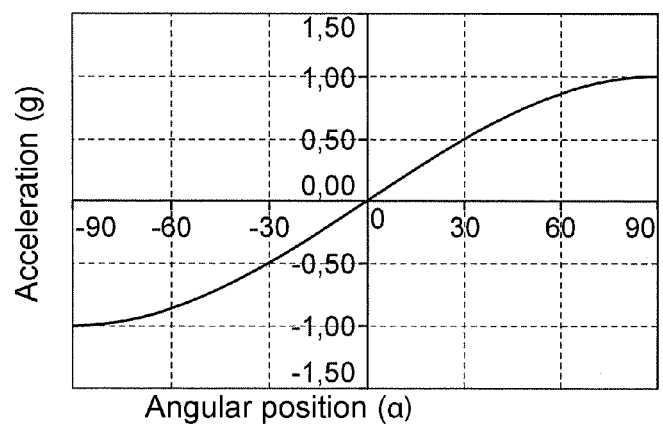
FIG. 7 shows the curve of variation of the acceleration measured as a function of the angle of inclination relative to the horizontal of an inclinometer.

FIG. 7 gives the curve for the acceleration as a function of the angular position of the inclinometer. Here the acceleration is expressed in g. A sinusoidal shape is seen here.

In the embodiment from FIGS. 1 to 3, incorporating an inclinometer 20 in a riser 16 of the stairs is proposed. Thus, with reference to FIG. 6, when the door 2 of the airplane is wide open (FIG. 1) and ready for embarking or debarking of passengers, the risers 16 is located vertically and the inclinometer indicates an angular position $\alpha=-90°$. The corresponding acceleration is then x"=$-1$ g $\approx-9.8$ ms$^{-2}$.

When the door is in an intermediate position, for example the position shown in FIG. 2 and in which the risers 16 are seen as inclined $-45°$ relative to the horizontal, the inclinometer 20 is subject to a gravitational acceleration of order $-0.7$ g. In closed position (FIG. 3), in the embodiment shown for purely illustrative purposes, the inclination is then of order $+45°$ and the gravitational acceleration is here substantially $+0.7$ g For each angular position, the inclinometer 20 provides a corresponding measured inclination (and/or gravitational acceleration). This signal is sent to the driving system which thereby knows the inclination of the door 2. For a closing sequence, the driving system can for example provide the following three phases:

slow start at low speed;
acceleration for reaching a nominal speed in midrange;
slowing and meeting at reduced speed.

Similarly, during an opening sequence, the motor speed can be adapted as a function of the measured position of the door. During opening sequences, in an embodiment of the invention, adapting the load on the motor as a function of the position of door 2 is proposed. For an opening sequence, it is possible to provide first an initial load suited for allowing the door 2 to "unseal" without risk of dragging along an operator commanding the opening of the door, and then using a second load or nominal load to make it possible to have a relatively high speed in midrange and finally a third fairly significant load for slowing the motor at the end of opening range and providing a low-speed meeting on the open-position stops. During an emergency opening, using a smaller load than the nominal load in midrange can be done in order to obtain a faster opening.

Figure 8:
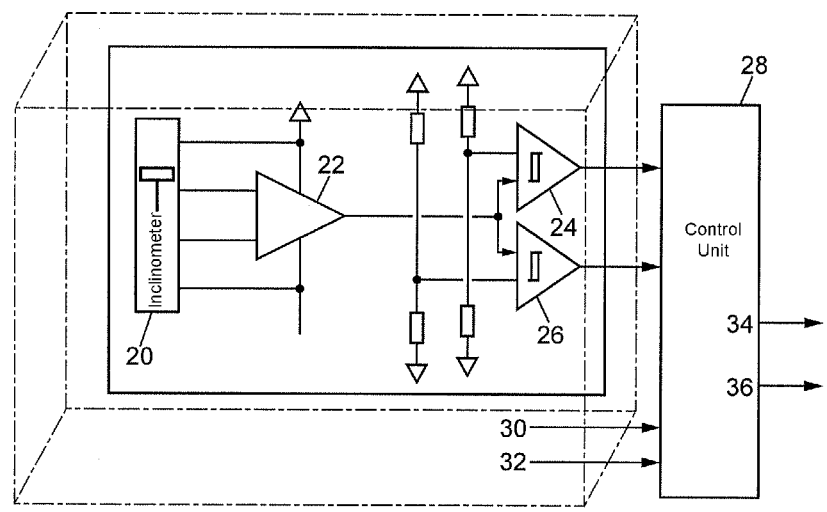
FIG. 8 is an electronic drawing of a processing device for a signal provided by an inclinometer.

FIG. 8 shows a simplified electronic drawing giving an example of processing a signal provided by an inclinometer. Here, for example, the configuration is as in FIG. 1. The inclinometer 20 is for example—purely illustrative and nonlimiting—a MEMS type inclinometer sold under the Schaevitz registered trademark and the T640 product line. The signal supplied at the output of the inclinometer 20 is then injected into an input stage comprising an amplifier 22. The amplified signal is then sent to two comparators. The purpose of the first comparator 24 is to detect whether the door 2 of the aircraft is nearly closed, meaning if the angle of the inclinometer 20 is close to $+45°$. The purpose of the second comparator 26 is to determine whether the door 2 with the aircraft is almost completely open, meaning whether the angle of the inclinometer 20 relative to the horizontal is close to $-90°$. The signals leaving the first comparator 24 and the second comparator 26 are then injected into a control unit 28 which also receives other control signals. As a nonlimiting example, there could be on the control unit 28 an input 30 corresponding to a door opening/closing command, another input 32 with which to indicate whether the opening command is an emergency command or not, etc. The control unit 28 delivers various output signals. Especially it sends by a first output 34 a motor speed instruction commanding opening/closing of door 2 and by a second output 36 the motor rotation direction which determines whether door 2 opens or closes.

In this signal processing device, the first comparator 24 defines a high threshold which corresponds, for example, to an acceleration of over 0.5 g meaning that the inclination of the inclinometer 20 is greater than $+30°$. Thus, the intent is to limit the closure speed of the door over the last $15°$ of rotation. Slowing the door over the last $15°$ before full opening thereof can also be chosen. In this case, the second comparator 26 analyzes the signal that it receives for determining whether it corresponds to an angular value below $-75°$. This second threshold then corresponds to an acceleration less than $-0.95$ g. Between these two thresholds (acceleration near the inclinometer included between $-0.95$ g and $+0.5$ g), the opening and closing speed of the door 2 corresponds to the nominal speed discussed above.

In this relatively simple embodiment, three different speeds are intended: zero speed (door closed or completely open), low-speed (in final phases of opening and closing) and nominal speed. It is also possible to provide, as discussed above, an emergency speed that is faster than nominal speed. Of course, other speeds can be considered. Other comparators could be provided in order to have, for example, an end of range approach speed and an end of range speed for the last few degrees to travel.

In the numeric example given above, it will be noted that for closing the door, the angular variation of $15°$ for the door 2 corresponds to a variation of order 0.2 g whereas near the wide open position, an angular variation of $15°$ corresponds to about 0.05 g.

Thus to improve overall the sensitivity of the inclinometer at the end of range, both at the end of opening and the end of closing, inclining the inclinometer 20 relative to the position illustrated is proposed. By turning it for example $22°$ counterclockwise, the inclinometer 20 then measures an inclination of $-68°$ when the door 2 is closed and $+67°$ when the door is open. There is then the same sensitivity at the end of range for opening and end of range for closing.

In the processing unit described above, the measurement done is a gravitational acceleration measurement and the comparators described compare accelerations. In an implementation variant the angular position of the door 2 could also be determined by using the arcsine function. Then it would be:

$$\alpha=\arcsin(V\text{ meas})$$

where V meas corresponds to the measured value of the acceleration divided by g (g$\approx$9.81 ms$^{-2}$).

According to another implementation variant, two inclinometers in quadrature can also be used, or else one biaxial inclinometer, where two measurements are made along perpendicular axes. The value of the angle measured is then obtained by using the arctangent function. With this method, the measurement can be linearized.

FIGS. 4 and 5 propose another implementation variant in which it is proposed to have two inclinometers. However, here the inclinometers are arranged such that one inclinometer is at the maximum sensitivity thereof when the door is fully open and the other inclinometer is at the maximum sensitivity thereof when the door is fully closed.

When applying this variant with two inclinometers 20 to the aircraft from FIGS. 1 and 3, the two inclinometers are then inclined one relative to the other by $45°$. The first inclinometer 20 is here set perpendicularly to the riser 16.

This inclinometer 20 is then at the maximum sensitivity thereof, and therefore also precision, when the door is fully open. The second inclinometer is for its part inclined 45° relative to the riser 16. It is thus at the maximum sensitivity thereof when the door is fully closed.

In the preceding, it was assumed that the aircraft was on the ground and that the ground was perfectly horizontal. The system described can however also operate when the ground is not horizontal. It is in fact sufficient, before any door opening or closing action, to provide for performing an inclination measurement. If the result of the measurement does not correspond to the expected result, an offset is then applied during the door opening and closing procedure. This way it is possible to compensate for many causes which could lead to a different result than the expected result: possible slope of the tarmac, or tilt of the aircraft due for example to a flat tire or a landing gear problem.

It is also conceivable to plan to install on the aircraft body 4 a reference inclinometer (not shown) in addition to or instead of the reference measurement described above. In that way that relative inclination of the door 2 can be obtained relative to the aircraft body 4 by taking the difference between the inclination measurement done by the sensor (or sensors) attached to the door 2 and the reference sensor attached on the aircraft body 4. Here again the difference can be included during opening and closing sequences of the door 2

The inclinometer 20 can be a sensor outside the electric box 10 which itself may or may not contain the motor for the opening/closing device. There are also inclinometers which can be incorporated directly on a board for the electronic box 10. When this box is mounted on the door 2, the value the inclination of the door 2 is then obtained directly in the electronic box 10.

For better management of the door opening and closing sequences, knowing the speed of the door 2 at a given moment can be useful. In this case, the present invention proposes using an inertial unit (also known under the acronym IMU for Inertial Measurement Unit). When such an inertial unit is used, the rotation speed of the door can be considered in a servo loop of the motor control for controlling the opening and closing of the door.

Another implementation variant relates to a configuration in which the motorized mechanism and the associated pulley are no longer in the door 2 but rigidly connected to the aircraft body 4. In such a scenario, the reference inclinometer (optional) mentioned above, can be incorporated, for example, onto a board from the control box associated with the motorized mechanism (or in another location).

Additionally, the system described for the command of the door can advantageously be coupled to means for limit-force detection well-known elsewhere. With such systems, startup of a closure sequence can be blocked if a mass is still present on the door or blocking the final closure of the door in case a force that is too large is detected (anti-pinching effect).

The original idea at the origin of the present invention starts from the observation that the relative position of the door relative to the aircraft structure and that the inclination thereof are in fact bijective, meaning that when one of the parameters is known, the other one is also.

The original idea of using an inclinometer is very advantageous. In fact, because the inclinometer works solely with the Earth's gravity, it is not necessary to establish a link with the aircraft structure.

The present invention then makes it possible to have on the one hand a simple mechanical integration with very reduced mass and not using expensive components.

The proposed solution on the other hand makes possible results which are precise and reliable.

The present invention is not limited to the embodiments described above as nonlimiting examples and to the variants discussed. It also involves any embodiment within reach of the person skilled in the art in connection with the claims here below.

What is claimed is:

1. A device for opening and closing an aircraft door hinged around an axis substantially parallel to the longitudinal axis the aircraft comprising: a motorized mechanism and a driving system combined with a control device having a system for acquisition of the angular position of the door relative to the structure of the aircraft, wherein the system for acquisition of the angular position of the door comprises at least one inclinometer combined with the door wherein the inclinometer is chosen from the set including unbalanced-mass inclinometers, inclinometers in the form of a micro-electromechanical system (MEMS) and inertial units.

2. A device for opening and closing an aircraft door hinged around an axis substantially parallel to the longitudinal axis the aircraft comprising: a motorized mechanism and a driving system combined with a control device having a system for acquisition of the angular position of the door relative to the structure of the aircraft, wherein the system for acquisition of the angular position of the door comprises at least one inclinometer combined with the door, wherein at least one inclinometer supplies the driving system a signal representative of the inclination of the door and wherein the driving system adjusts a speed and/or force servo control law on the basis of the inclination value of the door.

3. A device for opening and closing an aircraft door hinged around an axis substantially parallel to the longitudinal axis the aircraft comprising: a motorized mechanism and a driving system combined with a control device having a system for acquisition of the angular position of the door relative to the structure of the aircraft, wherein the system for acquisition of the angular position of the door comprises at least one inclinometer combined with the door, wherein at least one inclinometer supplies the driving system a signal representative of the inclination of the door and wherein the driving system adjusts a damping law for the motorized mechanism on the basis of the inclination value of the door.

4. A device according to claim 2 wherein the driving system compares the information coming from at least one inclinometer to predetermined thresholds each corresponding to a threshold of change of the servo control and/or damping law.

5. A device for opening and closing an aircraft door hinged around an axis substantially parallel to the longitudinal axis the aircraft comprising: a motorized mechanism and a driving system combined with a control device having a system for acquisition of the angular position of the door relative to the structure of the aircraft, wherein the system for acquisition of the angular position of the door comprises at least one inclinometer combined with the door, wherein the acquisition system comprises two inclinometers mounted in quadrature.

6. A device for opening and closing an aircraft door hinged around an axis substantially parallel to the longitudinal axis the aircraft comprising: a motorized mechanism and a driving system combined with a control device having a system for acquisition of the angular position of the door relative to the structure of the aircraft, wherein the system for acquisition of the angular position of the door comprises at least one inclinometer combined with the door, wherein the acquisition system comprises at least one biaxial inclinometer.

7. A device for opening and closing an aircraft door hinged around an axis substantially parallel to the longitudinal axis the aircraft comprising: a motorized mechanism and a driving system combined with a control device having a system for acquisition of the angular position of the door relative to the structure of the aircraft, wherein the system for acquisition of the angular position of the door comprises at least one inclinometer combined with the door, comprising a reference inclinometer attached to the aircraft structure.

8. A device according to claim 1 A device for opening and closing an aircraft door hinged around an axis substantially parallel to the longitudinal axis the aircraft comprising: a motorized mechanism and a driving system combined with a control device having a system for acquisition of the angular position of the door relative to the structure of the aircraft, wherein the system for acquisition of the angular position of the door comprises at least one inclinometer combined with the door, comprising a control box for the motorized mechanism comprising electronic boards, wherein at least one inclinometer is integrated on an electronic board for the control box.

9. A device for opening and closing an aircraft door hinged around an axis substantially parallel to the longitudinal axis the aircraft comprising: a motorized mechanism and a driving system combined with a control device having a system for acquisition of the angular position of the door relative to the structure of the aircraft, wherein the system for acquisition of the angular position of the door comprises at least one inclinometer combined with the door, the inclinometer giving a signal representative of the angular position of the door, and wherein the device for opening and closing the door further comprises means for sending the signal given by the inclinometer to the driving system.

10. A device according to claim 9, wherein the inclinometer is chosen from the set including unbalanced-mass inclinometers, inclinometers in the form of a micro-electro-mechanical system (MEMS) and inertial units.

11. A device according to claim 9, wherein at least one inclinometer supplies the driving system a signal representative of the inclination of the door and wherein the driving system adjusts a speed and/or force servo control law on the basis of the inclination value of the door.

12. A device according to claim 9, wherein at least one inclinometer supplies the driving system a signal representative of the inclination of the door and wherein the driving system adjusts a damping law for the motorized mechanism on the basis of the inclination value of the door.

13. A device according to claim 11 wherein the driving system compares the information coming from at least one inclinometer to predetermined thresholds each corresponding to a threshold of change of the servo control and/or damping law.

14. A device according to claim 9 wherein the acquisition system comprises two inclinometers mounted in quadrature.

15. A device according to claim 9, wherein the acquisition system comprises at least one biaxial inclinometer.

16. A device according to claim 9, comprising a reference inclinometer attached to the aircraft structure.

17. A device according to claim 9, comprising a control box for the motorized mechanism comprising electronic boards, wherein at least one inclinometer is integrated on an electronic board for the control box.

* * * * *

UNITED STATES PATENT AND TRADEMARK OFFICE
CERTIFICATE OF CORRECTION

| | |
|---|---|
| PATENT NO. | : 9,651,951 B2 |
| APPLICATION NO. | : 14/578808 |
| DATED | : May 16, 2017 |
| INVENTOR(S) | : Jean De La Bardonnie and Bertrand Prouzet |

It is certified that error appears in the above-identified patent and that said Letters Patent is hereby corrected as shown below:

In the Claims

In Claim 8, Column 9, Line 14, before the words "A device for opening" delete "A device according to claim 1".

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*